United States Patent
Hirase

(10) Patent No.: US 7,539,993 B2
(45) Date of Patent: May 26, 2009

(54) TIERED MULTI-MEDIA ACCELERATION SCHEDULER ARCHITECTURE FOR DYNAMIC CONFIGURABLE DEVICES

(75) Inventor: Yoshiya Hirase, Toyko (JP)

(73) Assignee: Nokia Corporation, Epsoo (FI)

( * ) Notice: Subject to any disclaimer, the term of this patent is extended or adjusted under 35 U.S.C. 154(b) by 930 days.

(21) Appl. No.: 10/740,036

(22) Filed: Dec. 18, 2003

(65) Prior Publication Data

US 2006/0179435 A1 Aug. 10, 2006

Related U.S. Application Data

(60) Provisional application No. 60/436,797, filed on Dec. 26, 2002.

(51) Int. Cl.
*G06F 9/46* (2006.01)
*G06F 15/00* (2006.01)
*G06F 3/00* (2006.01)

(52) U.S. Cl. .................. 718/102; 712/37; 710/10
(58) Field of Classification Search .......... 718/102; 712/37; 710/6, 7, 10
See application file for complete search history.

(56) References Cited

U.S. PATENT DOCUMENTS

| | | | | | |
|---|---|---|---|---|---|
| 5,442,789 | A * | 8/1995 | Baker et al. | ............ | 718/105 |
| 5,721,920 | A * | 2/1998 | Mak et al. | ............ | 718/102 |
| 6,370,591 | B2 * | 4/2002 | Kaihlaniemi | ............ | 719/321 |
| 6,789,132 | B2 * | 9/2004 | Hoskins | ............ | 710/5 |
| 6,834,315 | B2 * | 12/2004 | Johnson | ............ | 710/6 |
| 7,111,089 | B2 * | 9/2006 | Karam et al. | ............ | 710/48 |

* cited by examiner

*Primary Examiner*—Lewis A Bullock, Jr.
*Assistant Examiner*—Mengyao Zhe
(74) *Attorney, Agent, or Firm*—Harrington & Smith, PC

(57) ABSTRACT

Disclosed is a device architecture for running applications. The device architecture includes an operating system (OS) having an OS scheduler, a Dynamic Configurable Hardware Logic (DCHL) layer having a plurality of Logic Elements (LEs) and, interposed between the OS and the DCHL layer, a TiEred Multi-media Acceleration Scheduler (TEMAS) that cooperates with the OS scheduler for scheduling and configuring the LEs of the DCHL to execute applications. In the preferred embodiment the TEMAS is constructed to contain a Tier-1 scheduler that communicates with the OS scheduler, and at least one Tier-2 scheduler interposed between the Tier-1 scheduler and one DCHL configurable device.

18 Claims, 6 Drawing Sheets

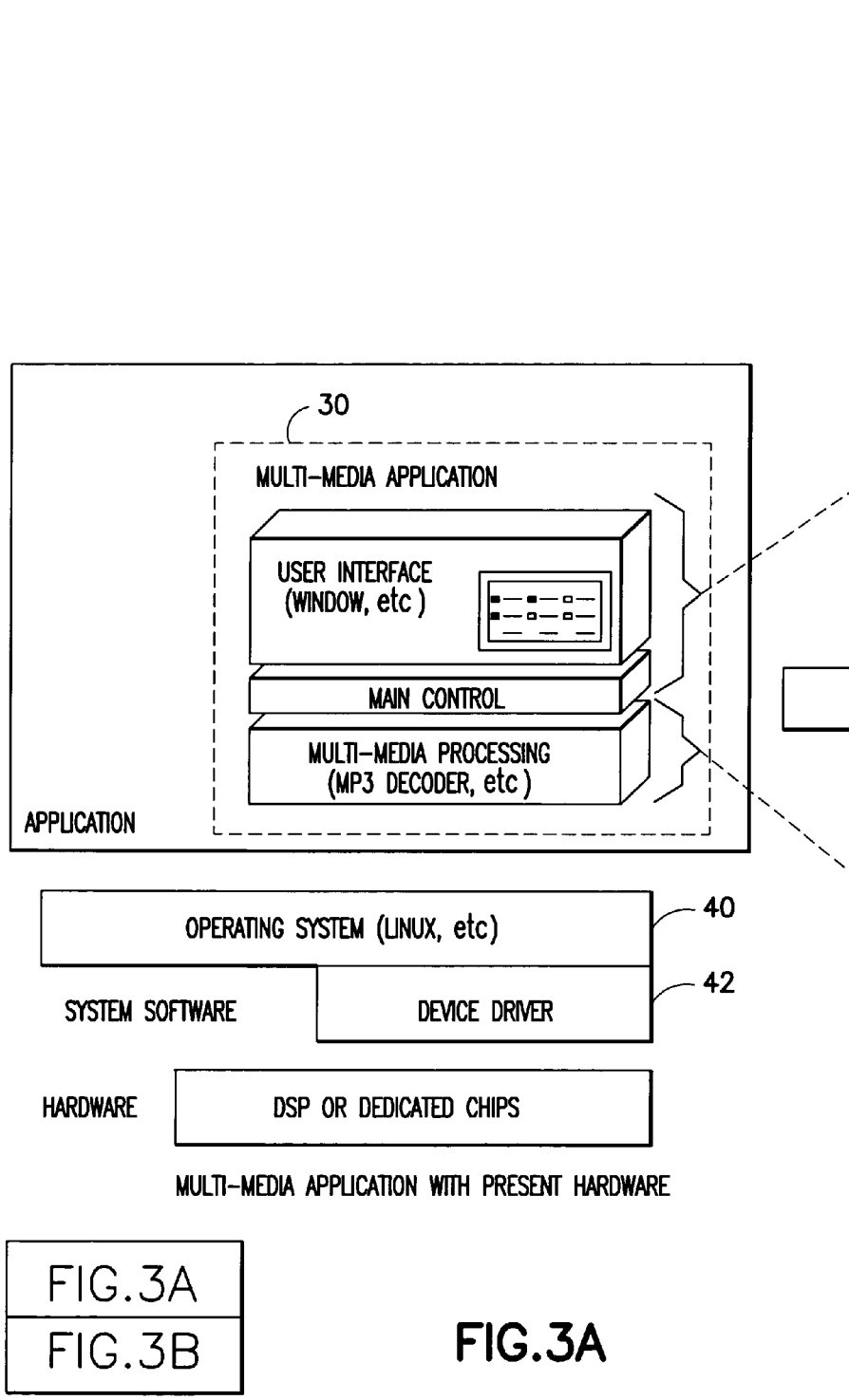

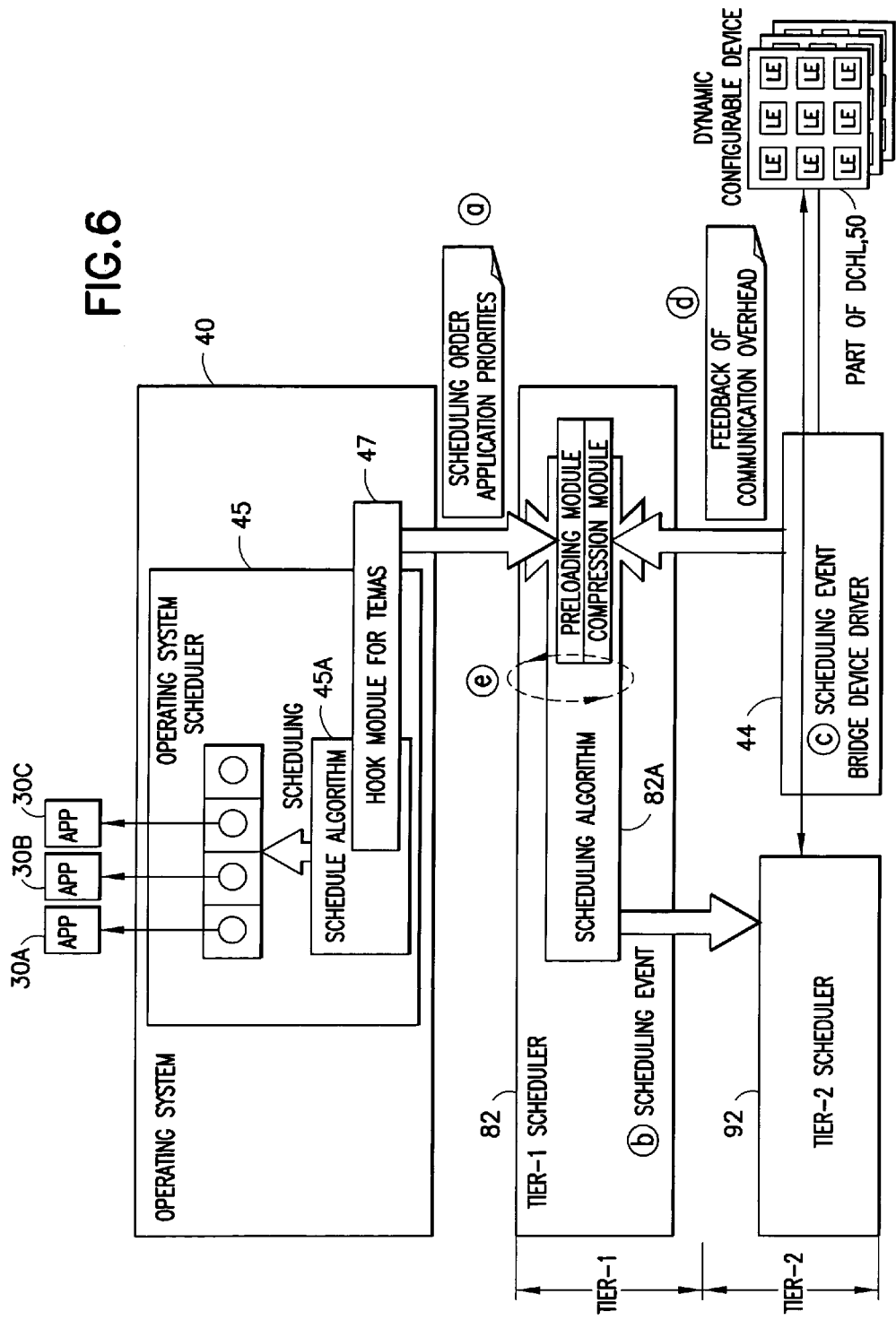

US 7,539,993 B2

TIERED MULTI-MEDIA ACCELERATION SCHEDULER ARCHITECTURE FOR DYNAMIC CONFIGURABLE DEVICES

CLAIM OF PRIORITY FROM A COPENDING U.S. PROVISIONAL PATENT APPLICATION

This patent application claims priority under 35 U.S.C. 119(e) from Provisional Patent Application No. 60/436,797, filed Dec. 26, 2002, the content of which is incorporated by reference herein in its entirety.

TECHNICAL FIELD

These teachings relate generally to computer operating systems and architectures, and more specifically relate to methods and apparatus that employ configurable hardware for implementing devices, such as handheld communicators and cellular telephones, which may be referred to as mobile terminals, and other types of user devices, such as personal digital assistants (PDAs).

BACKGROUND

Configurable hardware has not yet been implemented into commercial mobile terminals due to a lack of maturity of the technology, but future generation mobile terminals and other products are expected to require this type of hardware architecture in order to reduce power consumption and extend their functionality to new and more demanding applications, such as multi-media applications.

The conventional approach to mobile terminal design is to employ a general purpose digital signal processor (DSP) and possibly a custom integrated circuit, such as an ASIC, for the desired application(s). However, this conventional approach is proving to be less than adequate as mobile terminal applications increase in complexity and processing requirements. This is true at least for the reasons that the power consumption can be increased to the point that the power dissipation within the device becomes an important issue, and a lack of flexibility can result in wasted resources if the overall architecture must be designed to accommodate the most demanding applications.

SUMMARY OF THE PREFERRED EMBODIMENTS

The foregoing and other problems are overcome, and other advantages are realized, in accordance with the presently preferred embodiments of these teachings.

This invention provides a core software architecture for mobile terminals.

Disclosed is a device architecture for running applications. The device architecture includes an operating system (OS) having an OS scheduler, a Dynamic Configurable Hardware Logic (DCHL) layer comprised of a plurality of Logic Elements (LEs) and, interposed between the OS and the DCHL layer, a TiEred Multi-media Acceleration Scheduler (TEMAS) that cooperates with the OS scheduler for scheduling and configuring the LEs of the DCHL to execute applications. In the preferred embodiment the TEMAS is constructed to contain a Tier-1 scheduler that communicates with the OS scheduler, and at least one Tier-2 scheduler interposed between the Tier-1 scheduler and a DCHL configurable device.

Also disclosed is a method to execute applications in a device. The method includes providing an OS having an OS scheduler and a DCHL layer that includes a plurality of LEs; interposing between the OS and the DCHL layer the TiEred Multi-media Acceleration Scheduler (TEMAS) and operating the TEMAS in cooperation with the OS scheduler for scheduling and configuring the LEs of the DCHL to execute applications.

Also disclosed is a wireless communications device, such as a cellular telephone, that includes an applications layer comprising a plurality of applications; a service layer comprising an OS having an OS scheduler; a hardware layer comprising DCHL comprised of a plurality of LEs and interposed between the OS and the DCHL in the service layer and in a node layer, a TiEred Multi-media Acceleration Scheduler (TEMAS) that cooperates with the OS scheduler for scheduling and configuring the LEs of the DCHL to execute the applications.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 6 is a diagram that depicts an implementation example of the TEMAS.

DETAILED DESCRIPTION OF THE PREFERRED EMBODIMENTS

Figure 1:
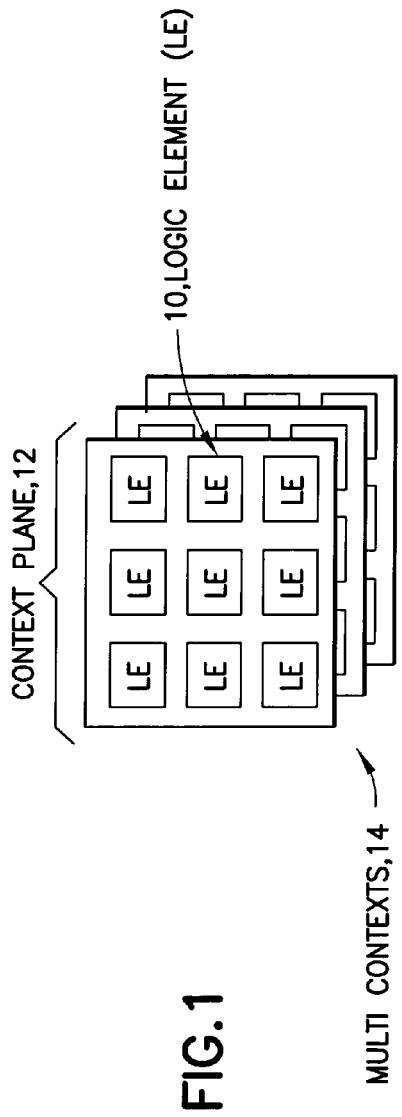
FIG. 1 is a diagram that is useful for introducing Dynamic Configurable Hardware Logic (DCHL) terminology.

One approach to overcoming the problems inherent in the use of generic DSPs and custom logic can be referred to as Dynamic Configurable Hardware Logic (DCHL). As can be seen in FIG. 1, the basic unit of the DCHL architecture is the Logic Element (LE) 10, a plurality of which are arranged in a context plane 12, or more simply a context. A plurality of context planes 12 result in a multi-context 14. The LE 10 is a unit to be configured as an algorithm logic, and an algorithm logic is assumed to include a set of LEs 10. More than one context 12 can be included in a single device, such as a mobile terminal, and more than one algorithm logic can be configured into one context 12, and can operate simultaneously.

Figure 2:
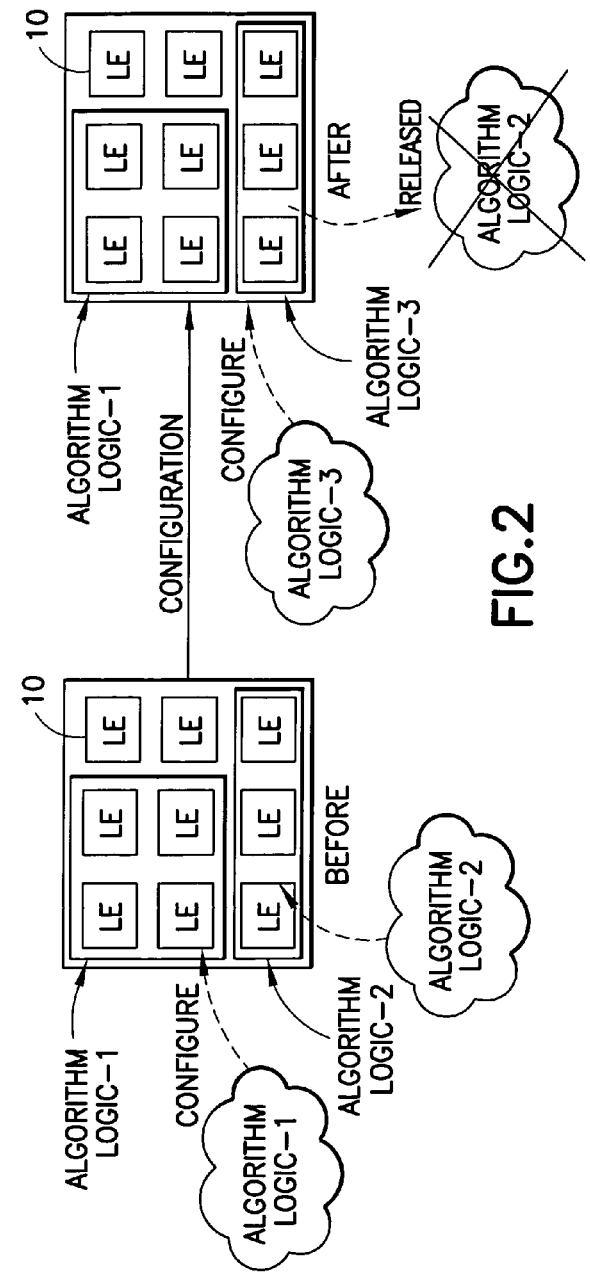
FIG. 2 shows an example of the configuration of the DCHL Logic Elements (LEs)

As is shown in FIG. 2, some LEs 10 can be configured partially (e.g., switched from algorithm logic-2 to algorithm logic-3) while other LEs 10 are operating (algorithm logic-1). One of the algorithm logics (algorithm logic-2) is shown as being released after the configuration process.

The majority of multi-media applications, such as MP3 players and movie players, operate with a generic operating system (hereinafter OS), not a real-time OS. For example, popular commercial products such as the SymbianOS™ and the PocketPC™ may be categorized as not using a real-time OS. Under such an OS, applications are scheduled using a heuristic algorithm, which results in the unpredictablity of the application scheduling. However, scheduling of the DCHL can occur asynchronously, and any optimal methods to improve the performance can be conducted. The preferred architecture of the scheduler enables the introduction of improved methods, such as preloading and configuration compression.

Due to the relative newness of the DCHL concept, no architecture has been introduced to overcome the scheduling problem. Methods, such as "preloading" and "configuration compression", to improve the potential of DCHL have been proposed as study topics for the hardware perspective.

This invention provides an essential architecture to exploit the capability of dynamically configurable devices to accelerate multi-media application software for mobile terminals. This invention provides a multi-layered scheduler, such as a two-layered scheduler, referred to as a TiEred Multi-media Acceleration Scheduler (hereinafter TEMAS) which deals with the DCHL layer as a generic system software model.

Figure 3B:
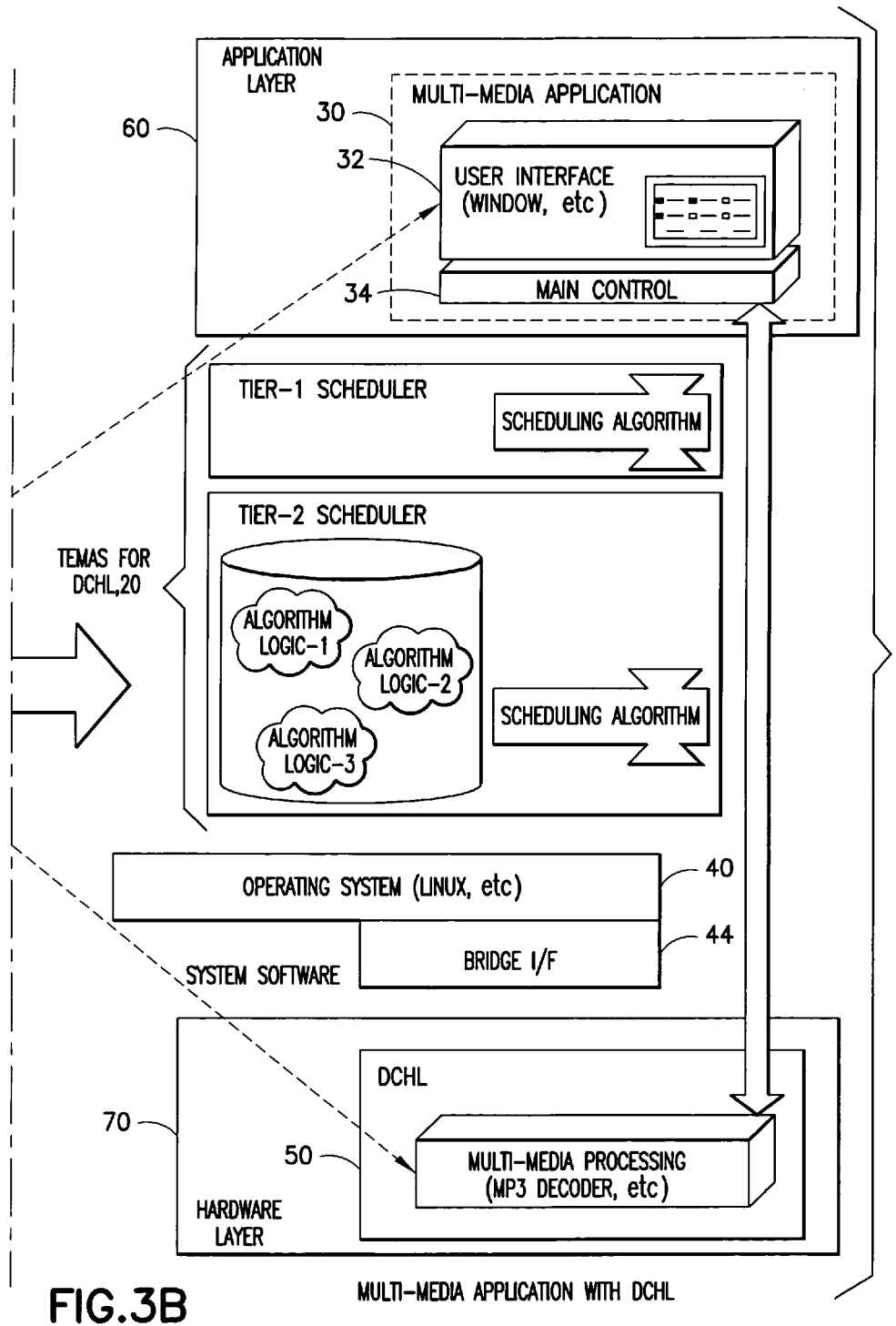
FIG. 3 contrasts the operation of a multi-media application using conventional hardware with the execution of the multi-media application using DCHL, and indicates the need for the TiEred Multi-media Acceleration Scheduler (TEMAS) in accordance with this invention.

FIG. 3 contrasts the execution of a multi-media application 30 with a current hardware platform versus the execution of the multi-media application using DCHL 50, and shows the utility of the TEMAS 20 of this invention. Note that in a system with the DCHL 50, the majority of the multi-media application 30, such as the user interface 32 and the main control 34, still operate in the application layer. Thus, the use of TEMAS 20 is important to coordinate communication between the application layer 60 and the hardware layer 70. In the illustrated embodiment the TEMAS 20 includes a Tier-1 scheduler and a Tier-2 scheduler. The operating system (OS) 40, such as Linux™, is coupled to the DCHL 50 via an interface bridge (bridge I/F) 44, as contrasted the device driver 42 in the conventional system using a DSP and/or dedicated chips.

One non-limiting advantage of this invention is the introduction of a fundamental architecture for the DCHL 50 for use in future mobile terminals and other types of devices. The TEMAS scheduler architecture becomes very important when a mobile terminal that is accelerated with DCHL 50 is implemented and combined with a generic OS. The TEMAS architecture provides the fundamental framework for DCHL 50 and an interface between the DCHL 50 and a generic OS 40. Additionally, improvements can be readily integrated into the TEMAS architecture by way of extension modules.

Figure 4:
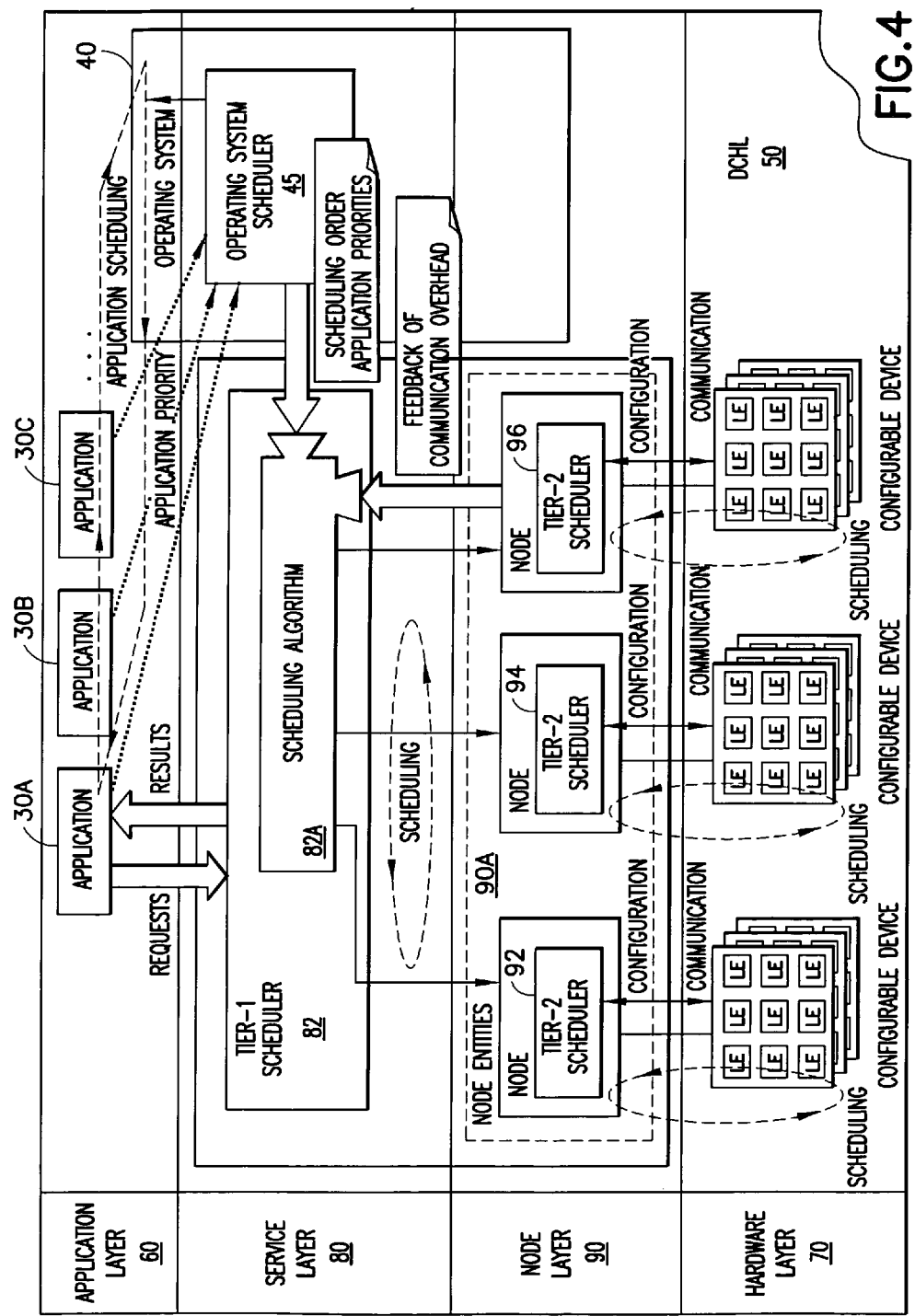
FIG. 4 is a simplified block diagram of the TEMAS in the context of a multi-layered device architecture, and shows the TEMAS interposed between the application layer, the OS and the DCHL hardware layer, and is illustrative of a run-time framework.

Referring to FIG. 4, four typical device layers are shown: the application layer 60 (containing three exemplary applications 30A, 30B, 30C), a service layer 80, a node layer 90 and the hardware layer 70 (the DCHL 50 layer). The Tier-1 Scheduler 82, containing a scheduling algorithm 82A, is shown resident at the service layer 80, while a plurality of Tier-2 Schedulers 92, 94, 96 are resident at the node layer 90, one for each node entity 90A. An OS Scheduler 45, part of the OS 40, is shown resident in the service layer 80 with the Tier-1 Scheduler 82. The OS Scheduler 45 manages all applications 30 that are ordinary applications, and multi-media applications that use the DCHL 50. The Tier-1 Scheduler 82 obtains scheduling information about multi-media applications from the OS Scheduler 45, via a Hook Module 47 (shown in FIG. 6). The most important information is the scheduling order of applications 30 and the priorities. The scheduling order is used to decide when preloading is performed for the DCHL 50. The priority of the applications gives the actual priority of the algorithm logic to be configured into and executed on the DCHL 50 (see FIG. 5). Since the priority of the algorithm logic cannot be determined until an actual application is attached to it, this function of the Tier-1 Scheduler 82 is important. The Tier-1 Scheduler 82 also obtains communication overhead from the device driver, and determines the difference in timing for the DCHL hardware (see (d) in FIG. 6), which aids in adjusting the scheduling timing. Additional algorithms can be extended using modules (see (e) in FIG. 6). The Tier-2 Scheduler 92, 94, 96 receives configuration requests from the Tier-1 Scheduler 82 (see (b) in FIG. 6, as well as FIG. 5), and schedules the algorithm logic to be executed within the DCHL 50 (see (c) in FIG. 6). As may be apparent, the separation of the TEMAS 20 into the at least two layers (Tier-1 and Tier-2 allows any type of DCHL 50 to be compatible with the heuristic scheduler of the generic OS 40 architecture.

Figure 5:
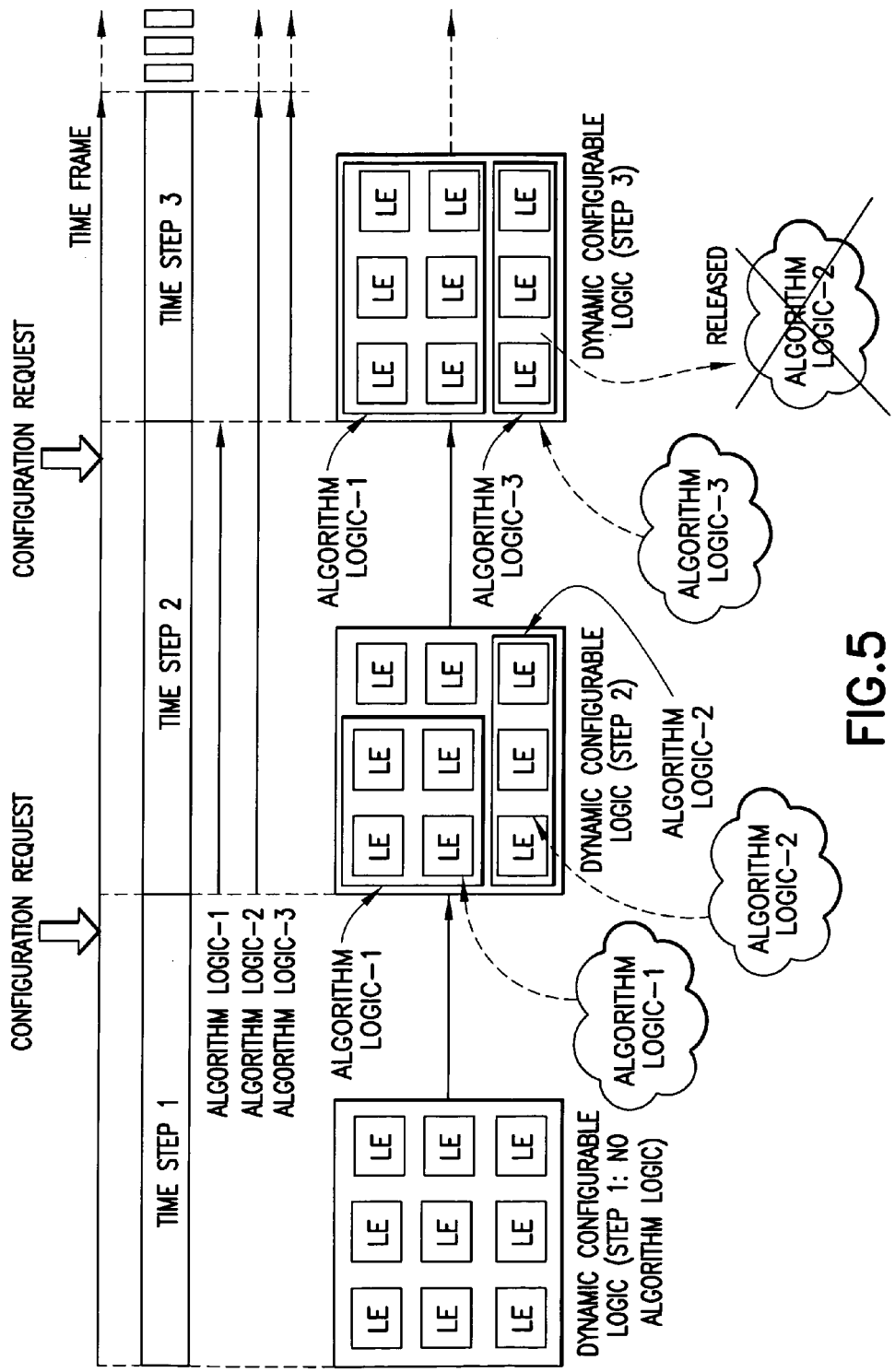
FIG. 5 shows the reconfiguration of the DCHL in response to configuration requests from the Tier-2 schedulers of FIG. 4, where the DCHL can accept more than one algorithm logic at the same time, and where a given algorithm logic can be configured into the DCHL while another one or ones are currently operating in the DCHL.

FIG. 5 shows the operation of the TEMAS 20 in response to configuration requests, that arrive during time steps, and the configuration and reconfiguration of the LEs of the DCHL 50 in accordance with various algorithm logics.

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. As but some examples, the use of other similar or equivalent operating systems, device types, application types and the like may be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A device architecture comprising:
a processor arranged to run an operating system (OS) comprising an OS scheduler;
hardware comprising a Dynamic Configurable Hardware Logic (DCHL) layer comprised of a plurality of Logic Elements (LEs); and
interposed between said OS and said DCHL layer, a TiEred Multi-media Acceleration Scheduler (TEMAS) that cooperates with the OS scheduler for scheduling the LEs of the DCHL to execute applications, where the TEMAS operates in response to configuration requests to configure and reconfigure at least some of the plurality of LEs such that at one time a particular LE is scheduled for operation with a first algorithm logic, and at another time the same particular LE is scheduled for operation with a second, different algorithm logic, where the TEMAS is comprised of a Tier-1 scheduler that communicates with the OS scheduler to determine a difference in timing for the DCHL hardware and at least one Tier-2 scheduler interposed between the Tier-1 scheduler and one DCHL configurable device that operates in response to configuration requests from the Tier-1 scheduler.

2. A device architecture as in claim 1, where said Tier-2 scheduler is responsive to priorities inherited from the applications when operating in response to the configuration requests.

3. A device architecture as in claim 1, where said plurality of LEs are disposed within at least one context plane.

4. A device architecture as in claim 1, comprising an application layer that comprises at least one application, a service layer that comprises said Tier-1 scheduler and said OS scheduler, a node layer that comprises said at least one Tier-2 scheduler that is coupled to a scheduling algorithm of said Tier-1 scheduler, and a hardware layer that comprises said at least one DCHL configurable device.

5. A device architecture as in claim 1, where said device comprises a device having wireless communications capability.

6. A method comprising:
 providing an operating system (OS) comprising an OS scheduler and a Dynamic Configurable Hardware Logic (DCHL) layer comprised of a plurality of Logic Elements (LEs);
 interposing between said OS and said DCHL layer a TiEred Multi-media Acceleration Scheduler (TEMAS); and
 operating the TEMAS in cooperation with the OS scheduler for scheduling the LEs of the DCHL to execute applications, where operating the TEMAS comprises responding to configuration requests to configure and reconfigure at least some of the plurality of LEs such that at one time a particular LE is scheduled for operation with a first algorithm logic, and at another time the same particular LE is scheduled for operation with a second, different algorithm logic, where the TEMAS is comprised of a Tier-1 scheduler that communicates with the OS scheduler to determine a difference in timing for the DCHL hardware and at least one Tier-2 scheduler interposed between the Tier-1 scheduler and one DCHL configurable device that operates in response to configuration requests from the Tier-1 scheduler.

7. A method as in claim 6, where said Tier-2 scheduler is responsive to priorities inherited from the applications when operating in response to the configuration requests.

8. A method as in claim 6, where said plurality of LEs are disposed within at least one context plane.

9. A method as in claim 6, comprising an application layer that comprises at least one application, a service layer that comprises said Tier-1 scheduler and said OS scheduler, a node layer that comprises said at least one Tier-2 scheduler that is coupled to a scheduling algorithm of said Tier-1 scheduler, and a hardware layer that comprises said at least one DCHL configurable device.

10. A method as in claim 6, executed in a device having wireless communications capability.

11. An apparatus, comprising:
 an applications layer comprising a plurality of applications;
 a processor arranged to run a service layer comprising an operating system (OS) having an OS scheduler;
 hardware comprising a hardware layer comprising Dynamic Configurable Hardware Logic (DCHL) comprised of a plurality of Logic Elements (LEs); and interposed between said OS and said DCHL in said service layer and in a node layer, a TiEred Multi-media Acceleration Scheduler (TEMAS) that cooperates with the OS scheduler for scheduling the LEs of the DCHL to execute said applications, where operating the TEMAS comprises responding to configuration requests to configure and reconfigure at least some of the plurality of LEs such that at one time a particular LE is scheduled for operation with a first algorithm logic, and at another time the same particular LE is scheduled for operation with a second, different algorithm logic, where the TEMAS is comprised of a Tier-1 scheduler that communicates with the OS scheduler to determine a difference in timing for the DCHL hardware and at least one Tier-2 scheduler interposed between the Tier-1 scheduler and one DCHL configurable device that operates in response to configuration requests from the Tier-1 scheduler.

12. An apparatus as in claim 11, where said Tier-2 scheduler is responsive to priorities inherited from the applications when operating in response to the configuration requests.

13. An apparatus as in claim 11, where said plurality of LEs are disposed within at least one context plane.

14. An apparatus as in claim 11, where said apparatus comprises a cellular telephone.

15. An apparatus as in claim 11, where said apparatus comprises a wireless communications device, and where said applications comprise multimedia applications.

16. An apparatus, comprising:
 a plurality of hardware logic elements;
 a logic element scheduler coupled to said plurality of hardware logic elements; and
 an application scheduler coupled to said logic element scheduler and to an operating system scheduler, said application scheduler configured to receive application information from said operating system scheduler and to generate and send application scheduling events to said logic element scheduler in accordance with said received information;
 where said logic element scheduler responds to receipt of scheduling events to configure and reconfigure at least some of the plurality of hardware logic elements such that at one time a particular hardware logic element is scheduled for operation with a first algorithm logic for executing the first algorithm logic, and at another time the same particular hardware logic element is scheduled for operation with a second, different algorithm logic for executing the second, different algorithm logic, where said application scheduler is further configured to receive feedback of communication overhead from said logic element scheduler to use in adjusting scheduling timing for the hardware logic elements.

17. The apparatus of claim 16, where the application information is comprised of application priority information and said logic element scheduler is further configured use the application priority information when scheduling the application logics onto the hardware logic elements.

18. The apparatus of claim 16, embodied in a device having wireless communications capability.

* * * * *